US012468644B2

United States Patent
Garg et al.

(10) Patent No.: US 12,468,644 B2
(45) Date of Patent: Nov. 11, 2025

(54) INVALIDATION OF PERMISSION INFORMATION STORED BY ANOTHER PROCESSOR

(71) Applicant: Apple Inc., Cupertino, CA (US)

(72) Inventors: Gaurav Garg, San Jose, CA (US);
Bernard J. Semeria, Palo Alto, CA (US); James Vash, San Ramon, CA (US); Jeff Gonion, Campbell, CA (US); Richard F. Russo, San Jose, CA (US); Peter A. Lisherness, Los Gatos, CA (US); Roy G. Moss, Palo Alto, CA (US); Rohit K. Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/742,597

(22) Filed: Jun. 13, 2024

(65) Prior Publication Data

US 2025/0245179 A1    Jul. 31, 2025

Related U.S. Application Data

(60) Provisional application No. 63/627,495, filed on Jan. 31, 2024.

(51) Int. Cl.
*G06F 13/28* (2006.01)
*G06F 12/1027* (2016.01)

(52) U.S. Cl.
CPC .......... *G06F 13/28* (2013.01); *G06F 12/1027* (2013.01); *G06F 2212/68* (2013.01); *G06F 2213/28* (2013.01)

(58) Field of Classification Search
None
See application file for complete search history.

(56) References Cited

U.S. PATENT DOCUMENTS 5,752,264 A * 5/1998 Blake .................... G06F 12/084
                                                711/131
9,218,289 B2   12/2015 Rychlik et al.
(Continued)

FOREIGN PATENT DOCUMENTS

CN    112148424 A    12/2020
CN    114721722 B     7/2022
(Continued)

OTHER PUBLICATIONS

International Search Report and Written Opinion in PCT Appl. No. PCT/US2025/012791 mailed May 15, 2025, 8 pages.

*Primary Examiner* — Stephanie Wu
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to performing remote invalidation of memory access permission information. In some embodiments, primary processor circuitry is configured to, based on execution of a remote permission table invalidate instruction (e.g., an ISA-defined instruction), send a remote invalidate command to secondary processor circuitry. The secondary processor circuitry includes secondary processor permission circuitry and is configured to, in response to the remote invalidate command sent by the primary processor, invalidate one or more entries in the secondary processor permission circuitry. In some embodiments, the secondary processor performs the invalidate without executing any instructions on the secondary processor circuitry.

20 Claims, 8 Drawing Sheets

(56) References Cited

U.S. PATENT DOCUMENTS

| | | | |
|---|---|---|---|
| 9,836,411 B2* | 12/2017 | Gschwind | G06F 12/0833 |
| 10,042,762 B2 | 8/2018 | Jayasena et al. | |
| 10,558,590 B2 | 2/2020 | Parker et al. | |
| 10,915,466 B2 | 2/2021 | Hagersten et al. | |
| 11,327,890 B1 | 5/2022 | Mukherjee | |
| 11,681,531 B2 | 6/2023 | Burger et al. | |
| 11,782,849 B2 | 10/2023 | Rozas et al. | |
| 2004/0030843 A1 | 2/2004 | Arimilli et al. | |
| 2004/0088496 A1 | 5/2004 | Glasco et al. | |
| 2007/0156972 A1 | 7/2007 | Uehara et al. | |
| 2008/0005794 A1* | 1/2008 | Inoue | G06F 21/56 |
| | | | 726/22 |
| 2009/0083496 A1 | 3/2009 | Stevens, Jr. | |
| 2011/0093646 A1 | 4/2011 | Koka et al. | |
| 2012/0089808 A1* | 4/2012 | Jang | G06F 12/1072 |
| | | | 711/206 |
| 2012/0137079 A1* | 5/2012 | Ueda | G06F 12/1036 |
| | | | 711/141 |
| 2012/0216002 A1* | 8/2012 | Moyer | G06F 12/1416 |
| | | | 711/E12.091 |
| 2013/0005794 A1 | 1/2013 | Kaemmerer et al. | |
| 2013/0262814 A1 | 10/2013 | Asaro et al. | |
| 2014/0156960 A1* | 6/2014 | Simoncelli | G06F 21/604 |
| | | | 711/163 |
| 2018/0089094 A1 | 3/2018 | Clancy et al. | |
| 2018/0165215 A1* | 6/2018 | Kumar | G06F 9/30047 |
| 2020/0117609 A1 | 4/2020 | Finkbeiner et al. | |
| 2020/0142838 A1 | 5/2020 | Rozas et al. | |
| 2020/0264973 A1 | 8/2020 | Lee | |
| 2020/0351370 A1* | 11/2020 | Radi | G06F 12/0828 |
| 2021/0149763 A1 | 5/2021 | Ranganathan et al. | |
| 2021/0200687 A1* | 7/2021 | Durham | G06F 12/1009 |
| 2022/0261351 A1 | 8/2022 | Vasudevan et al. | |

FOREIGN PATENT DOCUMENTS

| | | |
|---|---|---|
| CN | 114721726 B | 7/2022 |
| CN | 117472802 A | 1/2024 |
| DE | 112011103433 B4 | 10/2019 |
| TW | 1653532 B | 3/2019 |

* cited by examiner

Example fields of remote invalidate instruction 190

Example fields of remote invalidate command 195

INVALIDATION OF PERMISSION INFORMATION STORED BY ANOTHER PROCESSOR

PRIORITY CLAIM

The present application claims priority to U.S. Provisional App. No. 63/627,495, entitled "Invalidation of Permission Information Stored by Another Processor," filed Jan. 31, 2024, the disclosure of which is incorporated by reference herein in its entirety.

BACKGROUND

Technical Field

This disclosure relates generally to computer processors, and, more specifically, to invalidation by a processor of data in a remote permission circuit.

Description of Related Art

Different processors often access memory to perform various operations. For example, processors and co-processors may read instructions from memory and execute the instructions to read and write data in memory. As one specific example, a central processing unit (CPU) may execute applications that utilize a graphics processing unit (GPU), e.g., providing shader programs or compute kernels. The GPU may access the indicated programs/kernels and execute them to modify data in memory, which may include generating frames of graphics data for display.

One processor may manage the memory accesses of a coprocessor in various scenarios. For example, the processor may map pages used by the coprocessor processor in a virtual memory system. In addition, the processor may control permissions, e.g., to prevent the coprocessor from accessing other pages (or memory regions at various granularities).

DETAILED DESCRIPTION

In some processor implementations, control circuitry maintains permissions used to determine whether a particular entity is permitted to access a particular region of memory. For example, a permission table may be used to determine whether a particular program executing on a processor is allowed to access a particular memory or memory region.

In disclosed embodiments, a primary processor is configured to remotely invalidate memory permission information stored by a secondary processor (e.g., a coprocessor) in a secure and fine-grained manner. In some embodiments, a coprocessor is configured to determine whether an access to a region of memory is permitted based on multiple types of permission information. For example, a GPU may determine whether a memory access is permitted based on both page table access permission information and secure permission information specified by secure software (e.g., that is executed in the CPU). Various levels of permission information may be cached, e.g., with page table permission information stored in a GPU translation lookaside buffer (TLB) and secure permission information stored in a secure access permission table (SAPT) cache.

Multiple levels of access permission control may advantageously increase security while caching permission information in the GPU may provide this information quickly when needed. When the CPU changes or invalidates permission information in memory, however, it may also be important to invalidate the cached permission information in the GPU. For example, the processor may unmap a memory page that was originally mapped for the coprocessor or determine to change the level of permission for the memory page. In this case, the corresponding cached SAPT information should be invalidated, in some embodiments, so that the GPU does not access a page in a manner that is no longer permitted.

As will be discussed in detail below, the primary processor may invalidate a coprocessor's permission table by executing a permission-table-invalidate instruction that sends a permission table invalidate command to the coprocessor. The coprocessor, when receiving the permission table invalidate command may invalidate one or more entries of the permission table. The coprocessor may perform this invalidation without executing any instructions (although the coprocessor may be executing other instructions for other operations during a time interval in which the invalidations occur). The coprocessor may also issue an acknowledgement in response to receiving the invalidate command back to the primary processor, even in situations where the coprocessor is in a low-power state.

Overview of Remove Invalidation of Permission Information

Figure 1:
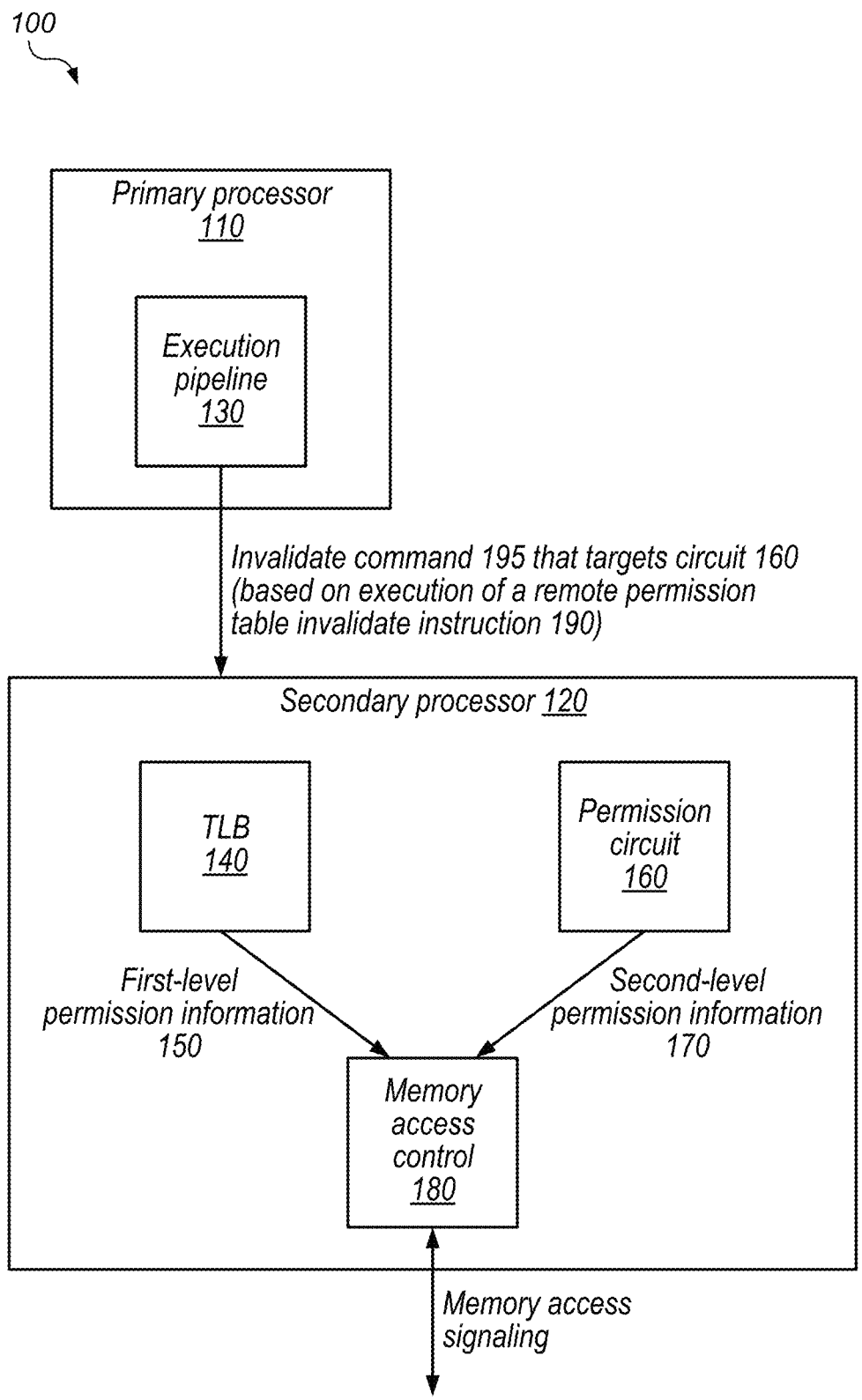
FIG. 1 is a block diagram illustrating an example primary processor configured to execute a remote invalidate instruction to cause an invalidation by a permission circuit of a secondary processor, according to some embodiments.

FIG. 1 is a block diagram illustrating an example primary processor configured to execute a remote invalidate instruction to cause an invalidation by a permission circuit, according to some embodiments. In the illustrated example, system 100 includes primary processor circuitry 110 and secondary processor circuitry 120. Primary processor 110 in turn includes execution pipeline 130 and secondary processor 120 includes TLB circuitry 140, permission circuit 160, and memory access control circuitry 180.

Primary processor 110, in some embodiments, includes circuitry and/or microcode configured to perform various operations e.g., based on executing instructions of a program. As used herein, the term "instruction" is intended to broadly cover commands to a processor in a computer program, including without limitation: instruction set architecture (ISA)-defined instructions, interpreted instructions, compiled instructions, microcode, machine code, etc. Execution pipeline 130, in various embodiments, is configured to execute instructions (including the remote invalidate instruction discussed herein).

Secondary processor 120, in some embodiments, is configured to execute instructions using one or more execution pipelines (not shown). Secondary processor 120 may be a firmware processor of a system-on-chip (SoC), a graphics processor, an image processor, a display processor, etc. In some embodiments, secondary processor 120 is a GPU that accesses a unified memory hierarchy shared with processor 110 and other secondary processors. Note that while the secondary processor is a coprocessor in some embodiments, in other embodiments the secondary processor is not a coprocessor and may be a peer of the primary processor in various aspects.

In some embodiments, primary processor 110 and secondary processor 120 are non-peers in one or more aspects. For example, secondary processor 120 and primary processor 110 may not be in the same shareability domain (e.g., outer/inner cacheable/sharable domains in ARM® architectures). The secondary processor 120 may operate outside of protection domains implemented by primary processor 110 (e.g., security rings, privilege levels, etc.). Further, the secondary processor 120 may not participate in a coherence scheme managed by the primary processor 110.

TLB circuitry 140, in some embodiments, is configured to store cache translation information and first level permission information 150. In some embodiments, first-level permission information 150 indicates whether secondary processor 120 is permitted access (e.g., read, write, execute) the memory region specified in its respective entry. In some embodiments, TLB circuitry 140 is configured to store first-level permission information 150 from one or more page tables stored in a memory circuit and maintained by primary processor 110, as will be discussed in more detail with respect to FIG. 2.

Permission circuit 160, in some embodiments, is circuitry configured to provide second-level permission information 170. In some embodiments, permission circuit 160 is configured to store second-level permission information 170 from a permission table stored in a memory circuit and potentially cached by primary processor 110, as will be discussed in more detail with respect to FIG. 2.

Memory access control circuitry 180, in the illustrated example, is configured to determine whether memory accesses to an address are permitted based on both first and second-level permission information 150 and 170 for the address. For example, a given type of access may be permitted only if both permission information 150 and permission information 170 indicate that the type of access is allowed. In one case of checking permissions for a particular access, control circuitry 180 sequentially checks first-level permission information 150 for the particular access, and proceeds to check second-level permission information 170 only after determining that first-level permission information 150 permits the particular access. Alternatively, access control circuitry 180 may receive permission information from fields of TLB 140 and permission circuitry 160 that match a given requested access and logically AND the permissions, for example. In some embodiments, a memory management unit (or another component of secondary processor 120) may determine, using memory access control circuit 180, whether it is permitted to access a particular memory region. Note that although permission information 150 and 170 may be consulted during the same memory access, they may be independently managed and may convey different permission information, as will be discussed in more detail with respect to FIG. 2. Further, they may indicate permissions for memory regions having different granularities.

As shown, memory access control 180 is configured to provide memory access signaling, e.g., to allow or prevent accesses. Thus, access control 180 may determine that an access to a particular address is permitted and accordingly signal secondary processor 120 to proceed with the memory access. On the other hand if access control 180 determines that secondary processor 120 is not permitted to access the particular address, it may signal secondary processor 120 to prevent the access. This may cause termination of software executing on secondary processor 120 with an error, for example.

Memory access control 180 may include comparator circuitry configured to compare permission information with value permission values, decode circuitry configured to determine a relevant location in a permission structure based on an incoming request, etc.

In some embodiments, secondary processor 120 is configured to perform various types of memory accesses and may check one or more levels of permission information for a given type of access. For example, one type of memory access is a direct memory access (DMA), as is well understood by those skilled in the art. For these accesses, a DMA controller (not shown) of secondary processor 120 may handle reads and writes for requested DMA transfers and may interrupt secondary processor 120 when a given transfer is complete. Another type of memory access are traditional memory access instructions executed by a pipeline of secondary processor 120 (e.g., a load/store pipeline). In various embodiments, multiple types of memory accesses are restricted based on one or more types of permission information (e.g., both traditional load/store accesses and DMA operations). In some embodiments, the second-level permission information 170 acts as a last level of security for DMA operations performed by secondary processor 120.

As shown, processor 110 is configured to remotely cause invalidation of data in permission circuit 160. More specifically, processor 110 executes a remote permission table invalidate instruction 190 using execution pipeline 130 and sends an invalidate command 195 to secondary processor 120 based on the execution, in some embodiments. The secondary processor 120 receives (e.g., via a fabric or bus) the remote invalidate command 195 from primary processor 110 and invalidates one or more entries in permission circuit 160 based on invalidate command 195. In some embodiments, circuitry of the secondary processor 120 (e.g., permission circuit 160) performs the invalidation without executing instructions on secondary processor 120, which may advantageously increase security relative to potentially-untrusted software running on secondary processor 120 performing the invalidation.

As will be discussed with respect to FIGS. 3A-B, command 195 may further include data specifying the granularity and location of the invalidation, which may advantageously allow fine-grained invalidations in certain scenarios and invalidations of larger regions when desired.

Detailed Example Invalidation of Cached Permission Information

Figure 2:
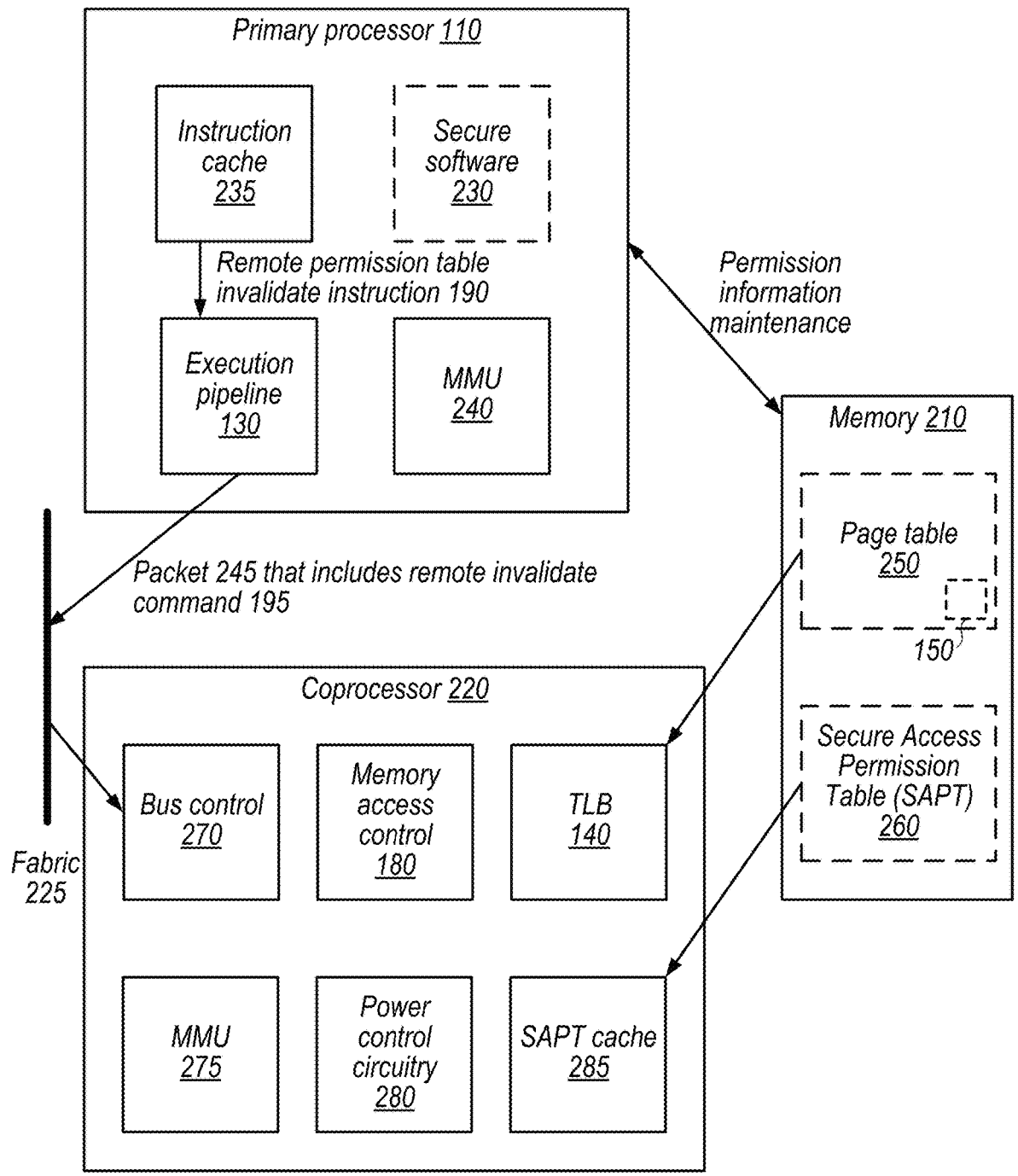
FIG. 2 is a block diagram illustrating a more detailed example of a system configured to perform a remote invalidate, according to some embodiments.

FIG. 2 is a block diagram illustrating a more detailed example of a system configured to perform a remote invalidate, according to some embodiments. In the illustrated example, the computing system includes primary processor 110, memory 210, and coprocessor 220 (which is one example of secondary processor 120). Primary processor 110, in the illustrated embodiment, includes instruction cache 235 and memory management unit (MMU) 240 and executes secure software 230. Secure software 230 is software (as indicated by dashed lines) executable to maintain page table 250 and secure access permission table (SAPT) 260 (data structures also indicated by dashed lines) containing permission information 150 and 170 in memory circuitry 210. As will be discussed below, memory access control 180 of coprocessor 220 may use cached versions of permission information from tables 250 and 260 (e.g., as shown, respectively cached in TLB 140 and SAPT cache 285).

Memory 210 may be a system memory and may be implemented using various appropriate circuit topologies, such as a dynamic random-access memory (DRAM). Memory 210 may be a separate device component or may be on-chip, for example.

In some embodiments, secure software 230 manages memory 210 (which may consist of one or multiple memory circuits) and accordingly maintains (e.g., grants, revokes, etc.) permissions and access for processor 110, coprocessor 220, and any other component that may need to access memory. For example, secure software 230 may maintain page table information (which may be initially generated by MMU 240) in page table 250 to facilitate mapping virtual addresses to physical addresses.

Further, software 230 may maintain permission information 150 in page table 250 to indicate access permissions for one or more client's specific memory pages. Software 230 may adjust the permission information, e.g., to revoke certain permissions, add permissions, modify permissions, etc.

Software 230 also maintains permission information in SAPT 260 which specifies whether coprocessor 220 has access to a given region of memory. The regions specified by SAPT 260 may be the same or different in size than the pages mapped in page table 250. In some embodiments, SAPT 260 is implemented as a table where each entry specifies a permission level for coprocessor 220 to access data in that particular region. Accordingly, secure software 230 may use SAPT 260 to record and manage (e.g., grant, revoke, etc.) access of coprocessor 220 to different regions of memory. As one specific example, SAPT 260 may include permission information permitting a GPU to read and write, but not execute data for a particular region of DRAM memory in system 100. In some embodiments, the permission for a given memory region is encoded using two bits, which may encode up to four permission levels. Note that the SAPT permission information may encoded at page granularity or at some other granularity, in different embodiments.

Software 230 may be software executing on a secure environment of primary processor 110. In some embodiments, for example, the secure environment managing software 230 is implemented as a secure kernel instance. This may enable software 230 to e.g., use specific memory locations that software executing on non-secure kernels of primary processor 110 is not allowed to access.

In some embodiments, the system implements a unified memory architecture in which memory spaces of various circuits (e.g., of a system on a chip) are backed in memory 210. SAPT 260 may be maintained for a specific client or may include a client identifier field to encode permission information for multiple clients. While secondary processor 120 is one example of a client, primary processor 110 may manage permission information, translation information, etc. for various client circuits. In other embodiments, a separate permission table may be maintained for each client.

Note that different software (potentially with different levels of trust) may separately maintain the first-level permission information 150 in page table 250 and the second-level permission information in SAPT 260 (which may be referred to as SAPT permission information). This may provide additional layers of security, e.g., by using SAPT 260 as a last security level controlled by more trusted software (similarly, two levels of permissions may increase security, provide permissions at different granularities, or both, even in embodiments where the same software maintains both sets of permission information).

Secure software 230 may be a root of trust and provide more security relative to software executed by other components such as coprocessor 220. Secure software 230 may also provide enhanced flexibility and performance relative to dedicated secure hardware such as a secure enclave processor, for example. In some embodiments, secure software 230 is executed by primary processor 110 at a privileged execution level that permits more control over processor 110 (and other circuits) than one or more less privileged execution levels. For example, processor 110 may, based on a privileged execution level (e.g., of secure software 230), permit the execution of remote permission table invalidate instruction 190 (and conversely prevent the execution of instruction 190 if issued by software at a less privileged execution level).

Coprocessor 220, in the illustrated example, includes TLB 140, memory access control circuitry 180, bus control circuitry 270, MMU 275, power control circuitry 280, and SAPT cache 285. As shown, coprocessor 220 is configured to cache data from page table 250—including first-level permission information 150—in TLB 140. In some embodiments, coprocessor 220 may use MMU 275 to walk page table 250 and store resulting translations in TLB 140. Then, coprocessor 220 may later access stored translations and corresponding permission information 150, e.g., when determining whether access to particular memory address is permitted.

SAPT cache 285 is an example of permission circuit 160. As shown, coprocessor 220 is configured to cache permission information from SAPT 260 in SAPT cache 285. In some embodiments, SAPT cache 285 includes entries specifying a particular memory region (e.g., a DRAM row of NKB) that is larger than the size of a typical memory access operation (e.g., a data word). Thus, an entry's second-level permission information 170 may specify permissions for coprocessor 220 accessing the entry's corresponding memory region.

Note that permission information cached in SAPT cache 285 may have a different format than the original information from SAPT 260. Further, second-level permission information 170 may include only a subset of the data stored in SAPT 260 (e.g., only SAPT entries 260 relevant to coprocessor 220 or recently accessed by coprocessor 220 due to size constraints). In some embodiments, SAPT 260 is sized to enable caching of all of the entries of SAPT 260. SAPT 260 is a direct-mapped cache, in some embodiments (although it may be set associative in other embodiments). SAPT cache 285 may act as a single-level filter for memory accesses and may be indexed based on upper bits of a given memory access, for example (and may be tagged by other bits in embodiments in which SAPT cache 285 stores only a subset of SAPT 260). Therefore, a given entry in SAPT cache 285 may include a valid field and a permissions field and may or may not be associated with a tag. SAPT cache 285 may be implemented using CAM and RAM circuitry, as a RAM, or as a latch array, for example.

Note that permission information may be maintained and/or cached differently than shown. For example, secure software 230 may maintain more permission tables than shown. As another example, SAPT cache 285 may cache permission information from more than one permission table maintained by secure software 230. As yet another example, coprocessor 220 may include additional cache circuitry that stores more permission information in addition to the first and second-level permission information 150 and 170.

In some embodiments, primary processor 110 is the sole entity managing SAPT 260, and may therefore also ensure that permission information cached in coprocessor 220 is up to date with corresponding versions in primary processor 110. For example, any grant, revocation, or update of permission information 170 of SAPT 260 may be accompanied by a corresponding invalidation or update of SAPT cache 285. Because these invalidations may not rely on software running on coprocessor 220, they may have increased security, relative to invalidations that involve instructions executed by coprocessor 220. As shown, primary processor 110 may execute a remote permission table invalidate instruction 190 to invalidate cached information in SAPT cache 285.

The remote permission table invalidate instruction 190 may be retrieved from instruction cache 235 (which may cache instructions retrieved from memory 210) and executed by execution pipeline 130. In some embodiments, invalidate instruction 190 is part of a permission update routine in the code of secure software 230. Using instruction 190 to maintain consistency of SAPT cache 285 with respect to SAPT 260 may advantageously prevent coprocessor 220 from caching second-level permission information 170 in SAPT cache 285 that no longer corresponds to its corresponding data in SAPT 260. As shown in FIG. 3A and discussed in detail below, instruction 190 may have fields (e.g., address and granularity) specifying one or more lines or entries of SAPT cache 285 to be invalidated.

Based on execution of remote invalidation instruction 190, primary processor 110 sends a remote invalidate command 195 as a packet 245 via fabric 225. Similar to instruction 190, command 195/packet 245 may include information that further specifies the data to be invalidated (e.g., address (or portion of an address), granularity, client ID), as described below with reference to FIG. 3B. Fabric 225, in some embodiments, is a fabric configured to handle communications between processor 110 and coprocessor 220, e.g., using the Advanced extensible Interface (AXI) protocol.

Coprocessor 220 receives packet 245 at bus control circuitry 270, which is configured to forward invalidate command 195 to trigger invalidation of one or more entries of SAPT cache 285. Invalidation may include setting an invalid bit for the entr(ies) corresponding to the specified address, for example. One or more barrier operations may be used to synchronize the invalidation with memory accesses by coprocessor 220, as discussed in detail below with reference to FIG. 4.

Power control circuitry 280, in some embodiments, is configured to manage the power consumption of coprocessor 220. Thus, power control circuitry 280 may place coprocessor 220 in a low-power state to reduce its consumption (e.g., by power gating, clock gating, adjusting clock frequency, or some combination thereof) when it is not executing operations. In some embodiments, coprocessor 220 includes buffer circuitry configured to store command 195 when coprocessor 220 is operating in a low-power state in which it is not configured to service remote invalidate comments. Coprocessor 220 may, in response to control circuitry 280 causing an exit from the power-down state, retrieve and perform the buffered invalidate command 195. All or a portion of power control circuitry 280 may be external to coprocessor 220, in some embodiments. Power control circuitry 280 may be a microcontroller, for example, configured to implement finite state machines for power management based on various inputs that indicate status of circuitry being powered.

Bus control 270 may auto-acknowledge receipt of the remote invalidate command even when processor 110 is in a low-power state, e.g., in conjunction with placing the command in the command buffer.

Note that processor 110 may also adjust or invalidate information in page table 250 for various reasons and may similarly remotely invalidate entries in TLB 140 in conjunction with SAPT cache allocation or independently of SAPT cache invalidation.

Example Instruction/Command Fields

Figure 3A:
FIG. 3A is a diagram illustrating example fields of a remote permission invalidate instruction, according to some embodiments.

FIG. 3A is a diagram illustrating example fields of a remote invalidate instruction, according to some embodiments. The address field, in the illustrated embodiment, indicates the location in the cache (e.g., permission circuit 160/SAPT cache 285 of coprocessor 220) that is to be invalidated. In some cases, permission circuit 160 is tagged using a physical address (e.g., of memory 210) and the address includes all or a portion of a physical address corresponding to cache entr(ies) to be invalidated. In these embodiments, processor 110 may be able to generate a physical address for the invalidation because it manages and accesses entries of SAPT 260, for example.

In other embodiments, permission circuit 160 is virtually tagged and the address is all or a portion of a virtual address. In some embodiments, the address field may include multiple addresses, which may be non-contiguous, for potential invalidation of different cache lines. In some embodiments, instruction 190 includes a range (e.g., a low and a high address) to invalidate one or more regions of permission circuit 160 that fall within the range.

The granularity field, in the illustrated embodiment, describes the granularity of the invalidation. If the granularity indicates an individual entry, then the invalidation may be for the cache entry corresponding to the address specified in the address field, according to some embodiments. Otherwise, if the granularity indicates multiple entries, coprocessor 220 is configured invalidate up to N corresponding lines, where N is an integer greater than one. In some embodiments, granularity is a numeric value specifying the number of entries to potentially be invalidated. In other embodiments, the size is fixed (e.g., to correspond to the number of entries in permission circuit 160 or a fixed portion thereof).

Figure 3B:
FIG. 3B is a diagram illustrating example fields of a remote permission invalidate command, according to some embodiments.

FIG. 3B is a diagram illustrating example fields of a remote invalidate command, according to some embodiments. The processor ID field, in the illustrated embodiment, indicates (e.g., for routing by a fabric) which particular client of a group of clients is to receive the invalidate command at which the invalidate is to be performed.

As noted, a remote invalidate command may be generated in response to a remote invalidate instruction, and fields of the remote invalidate command may thus be inherited from their corresponding fields at the remote invalidate instruction in FIG. 4A. For example, in some embodiments the granularity fields are identical in functionality to those of the remote invalidate instructions. But in some embodiments these fields may differ from their analogues at instruction 190.

Example Sequencing

Figure 4:
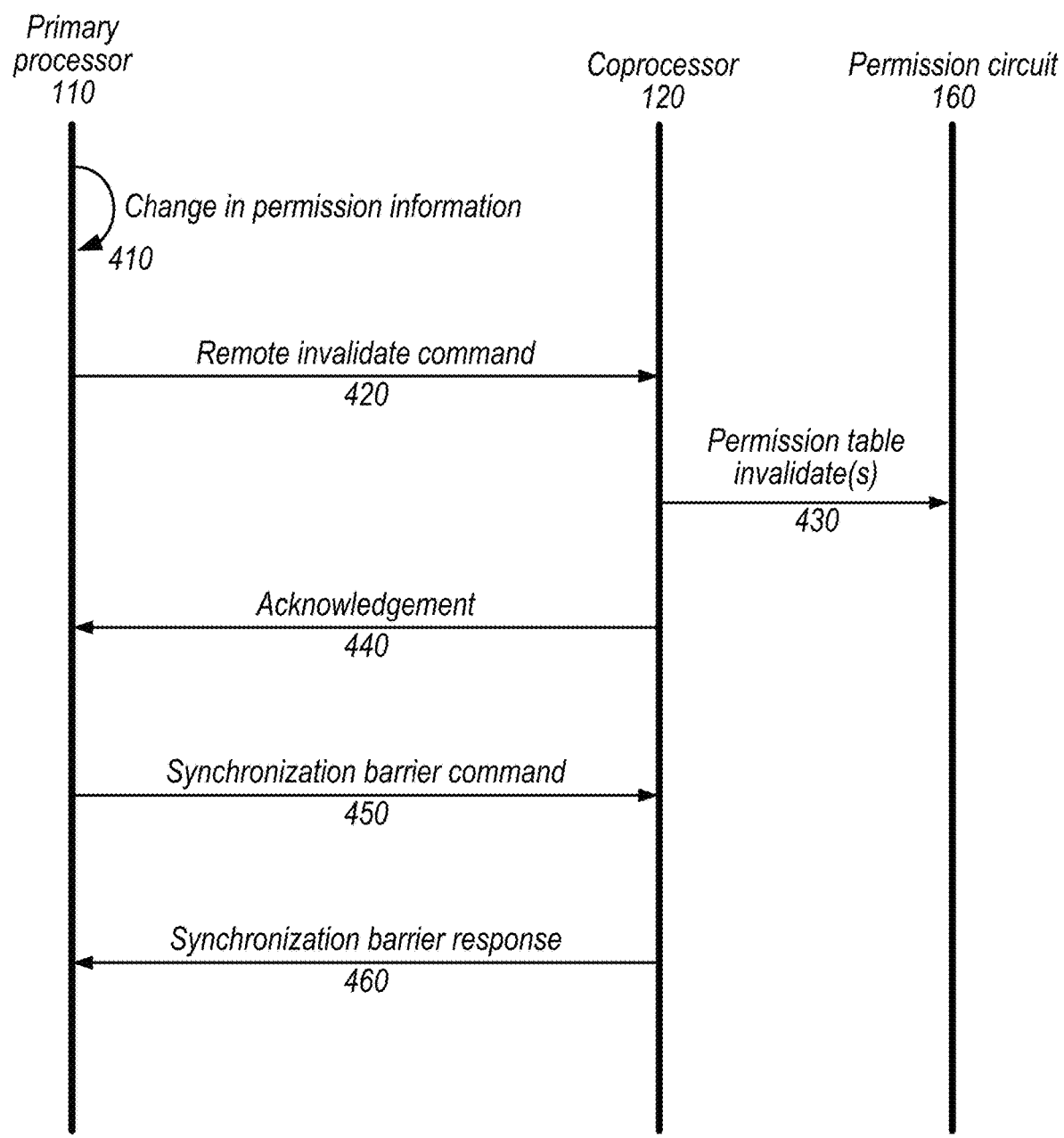
FIG. 4 is a communications diagram illustrating example communication between a primary processor, a coprocessor, and a coprocessor permission circuit, according to some embodiments.

FIG. 4 is a communications diagram illustrating example communication between a primary processor, a coprocessor, and a coprocessor permission circuit during a remote invalidate, according to some embodiments. In the illustrated embodiment, primary processor 110 initiates an invalidation of data in permission circuit 160 of coprocessor 220 based on the execution of a remote invalidate command 420.

As shown, the example remote invalidate command 420 is triggered by a change 410 in permission information at processor 110 (e.g., secure software 230 modifying SAPT 260). Processor 110 then sends a remote invalidate command 420 to coprocessor 220 (e.g., based on execution of instruction 190). In some embodiments, processor 110 sends command 420 to coprocessor 220 in a fabric message or packet.

Coprocessor 220 receives invalidate command 420 and accordingly performs permission table invalidate(s) 430 at permission circuit 160. In some cases, the entry of permission circuit 160 that is invalidated includes permissions for a memory region that includes an address specified by command 420.

Coprocessor 220, in response to remote invalidate command 420, is configured to return an acknowledgement 440 of receipt (regardless of whether the coprocessor 220 immediately performs invalidate 430, in some embodiments). For example, if coprocessor 220 is in a power-down state (e.g., initiated by power control circuitry 280), then coprocessor 220 may both return acknowledgement 440 prior to actually performing the invalidate(s) 430. Acknowledgement 440 may guarantee to processor 110 that the invalidate will eventually be completed.

Primary processor 110 may issue synchronization barrier commands (e.g., triggered by ARM DSB or DMB instructions executed by execution pipeline 130) in conjunction with remote invalidate command 420. Coprocessor 220 may enforce a particular ordering of operations in response to the received barrier command(s).

For example, as shown, coprocessor 220 may be configured to, when receiving synchronization barrier command 450 issued after remote invalidate command 420, ensure that all relevant older operations are complete prior to execution of any instructions younger than the barrier command 450. For example, coprocessor 220 may utilize a load queue, a store queue, or both to track relative ages of memory access instructions and use these queue(s) to properly enforce the barrier command 450. Furthermore, barrier command 450 may also ensure that the invalidate(s) 430 to permission circuit 160 are all complete prior to completion of the barrier command. Thus, barrier command 450 may cause the invalidate to be globally visible to memory access operations issued after invalidate command 420.

Coprocessor 220 returns a synchronization barrier response 460 based on implementing the barrier command 450. In some embodiments, acknowledgement 440 is sent in conjunction with response 460. But in other embodiments, acknowledgement 440 is sent independently of performing response 460.

In some embodiments, primary processor 110 may issue a synchronization barrier command prior to issuing remote invalidate command 420. In some embodiments, coprocessor 220 is configured to enforce, in response to a barrier command issued before remote invalidate command 420, an ordering of operations that forces coprocessor 220 to perform invalidate 430 after that barrier command and all older relevant memory accesses have completed.

Example Method

Figure 5:
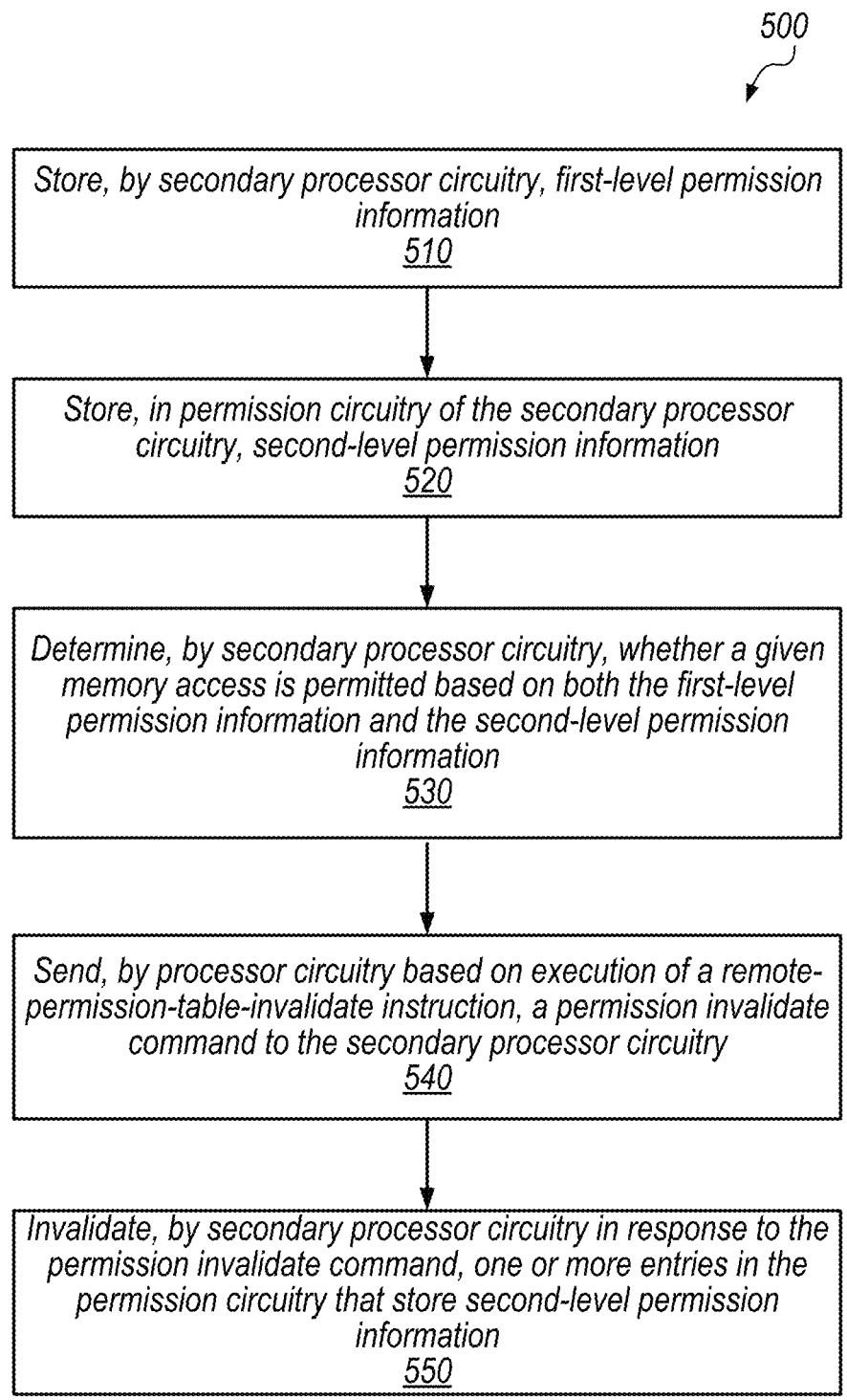
FIG. 5 is a flow diagram illustrating an example method for a remote permission circuit invalidation, according to some embodiments.

FIG. 5 is a flow diagram illustrating an example method for a remote permission circuit invalidation, according to some embodiments. according to some embodiments. Method 500 shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, secondary processor circuitry (e.g., secondary processor 120) stores (e.g., in a TLB such as TLB 140) first level permission information (e.g., first-level permission information 150).

At 520, in the illustrated embodiment, secondary processor circuitry stores, in permission circuitry (e.g., permission circuit 160) second-level permission information (e.g., second-level permission information 170).

In some embodiments, the primary processor is configured to execute secure software to generate the second-level permission information. In some embodiments, memory circuitry is configured to store second-level permission information specified by primary processor circuitry (e.g., primary processor 110), and permission circuitry is configured to store second-level permission information retrieved from the memory circuitry.

In some embodiments, the permission circuitry the permission circuitry is a direct mapped cache, and the coprocessor circuitry is configured to index into the permission circuitry based on a set of upper bits of a given memory addresses. In some embodiments, a given entry of the permission circuitry includes second-level permission information for a region of memory that is greater in size than the size of memory access operations that the coprocessor circuitry is configured to perform.

At 530, in the illustrated embodiment, secondary processor circuitry determines (e.g., using memory access control 180) whether a given memory access is permitted based on both the first-level permission information and second-level permission information.

In some embodiments, the coprocessor circuitry is configured to perform direct memory address (DMA) operations to memory circuitry.

At 540, in the illustrated embodiment, primary processor circuitry (e.g., primary processor 110) sends, based on execution of a remote-permission-table-invalidate instruction (e.g., instruction 190), a permission invalidate command (e.g., invalidate command 195) command to secondary processor circuitry.

In some embodiments, the permission invalidate command is included in a packet transmitted on a communication fabric, wherein the packet includes at least the following 1) information that specifies one or more addresses whose corresponding permissions are to be invalidated and 2) an identifier of the coprocessor circuitry. In some embodiments, the primary processor circuitry is further configured to send a barrier command in conjunction with the permission invalidate command, wherein the barrier command ensures completion of older memory access operations that access at least one entry specified by the invalidate command to determine respective access permission.

At 550, in the illustrated embodiment, secondary processor circuitry invalidates, in response to the permission invalidate command, one or more entries in the permission circuitry that store second-level permission information.

In some embodiments, the coprocessor circuitry is configured to perform the permission invalidation without executing any instructions on the coprocessor circuitry.

In some embodiments, the coprocessor circuitry further includes power management circuitry configured to place the coprocessor circuitry in a low-power state, and the apparatus (e.g., system 100) is configured to guarantee, when operating in a low-power state, the invalidation of the one or more entries in permission circuitry. In some embodiments the coprocessor circuitry further includes buffer circuitry configured to store, when operating in the low-power state, the permission invalidate command, and the coprocessor circuitry is configured to retrieve and perform the permission invalidate command in response to exiting the low-power state.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 6:
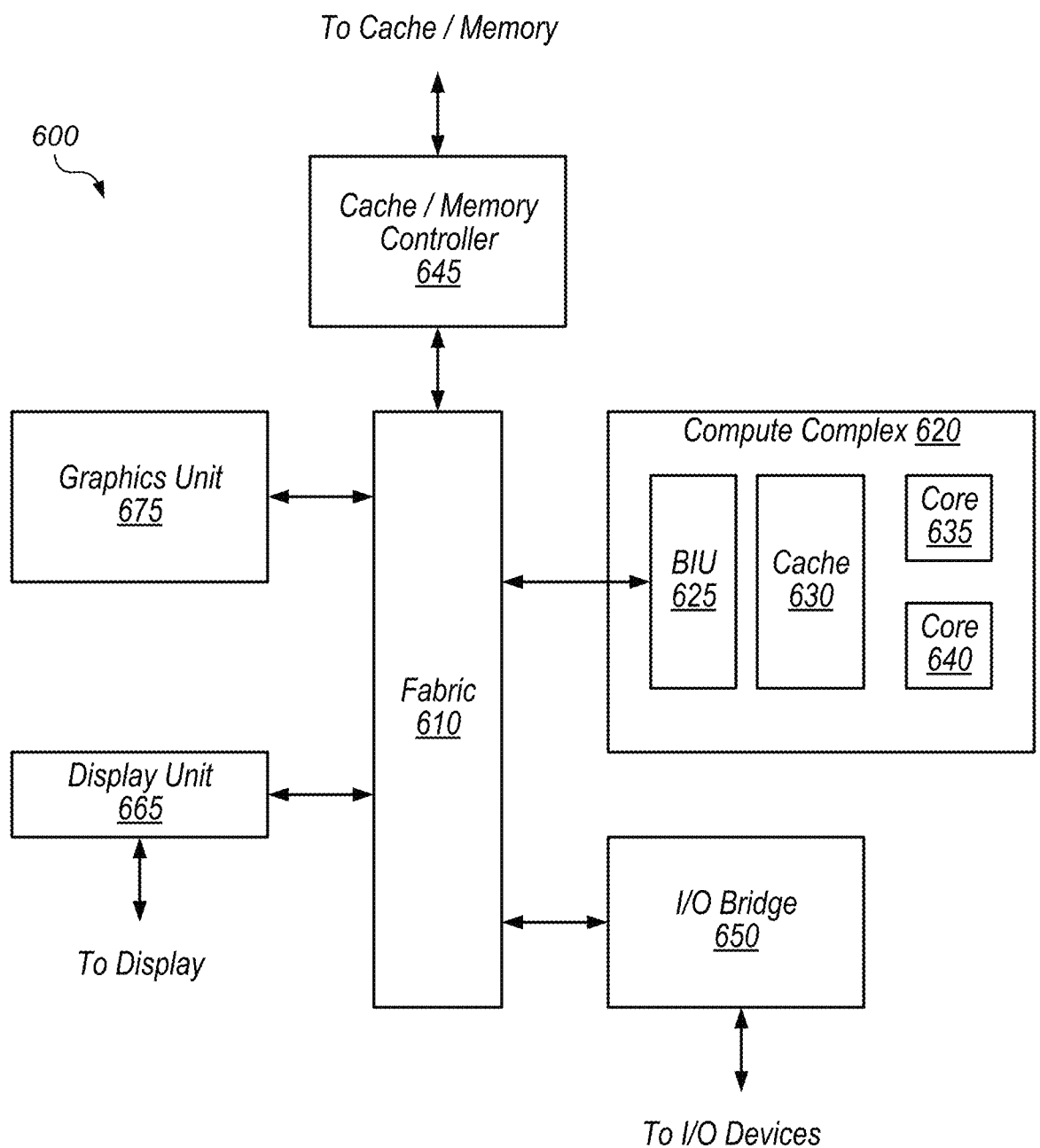
FIG. 6 is a block diagram illustrating an example computing device, according to some embodiments.

Referring now to FIG. 6, a block diagram illustrating an example embodiment of a device 600 is shown. In some embodiments, device 600 may implement functionality of system 100. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions. These instructions may be stored in computer readable medium such as a memory coupled to memory controller 645 discussed below.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches. Memory coupled to controller 645 may be any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low-power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 620 to cause the computing device to perform functionality described herein.

Graphics unit 675 may include one or more processors, e.g., one or more graphics processing units (GPUs). Graphics unit 675 may receive graphics-oriented instructions, such as OPENGL®, Metal®, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 600 with connectivity to various types of other devices and networks.

Example Applications

Figure 7:
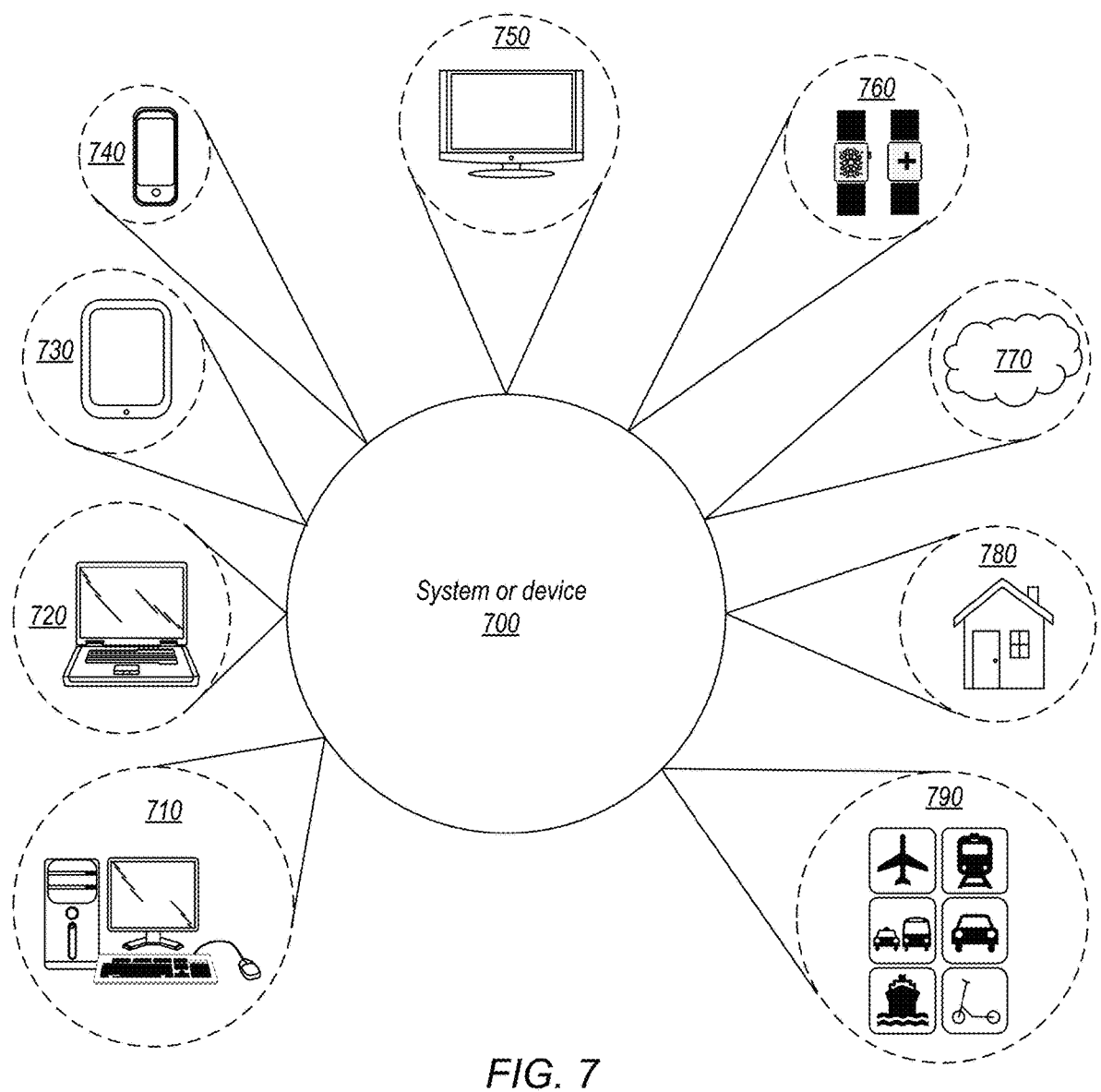
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 8:
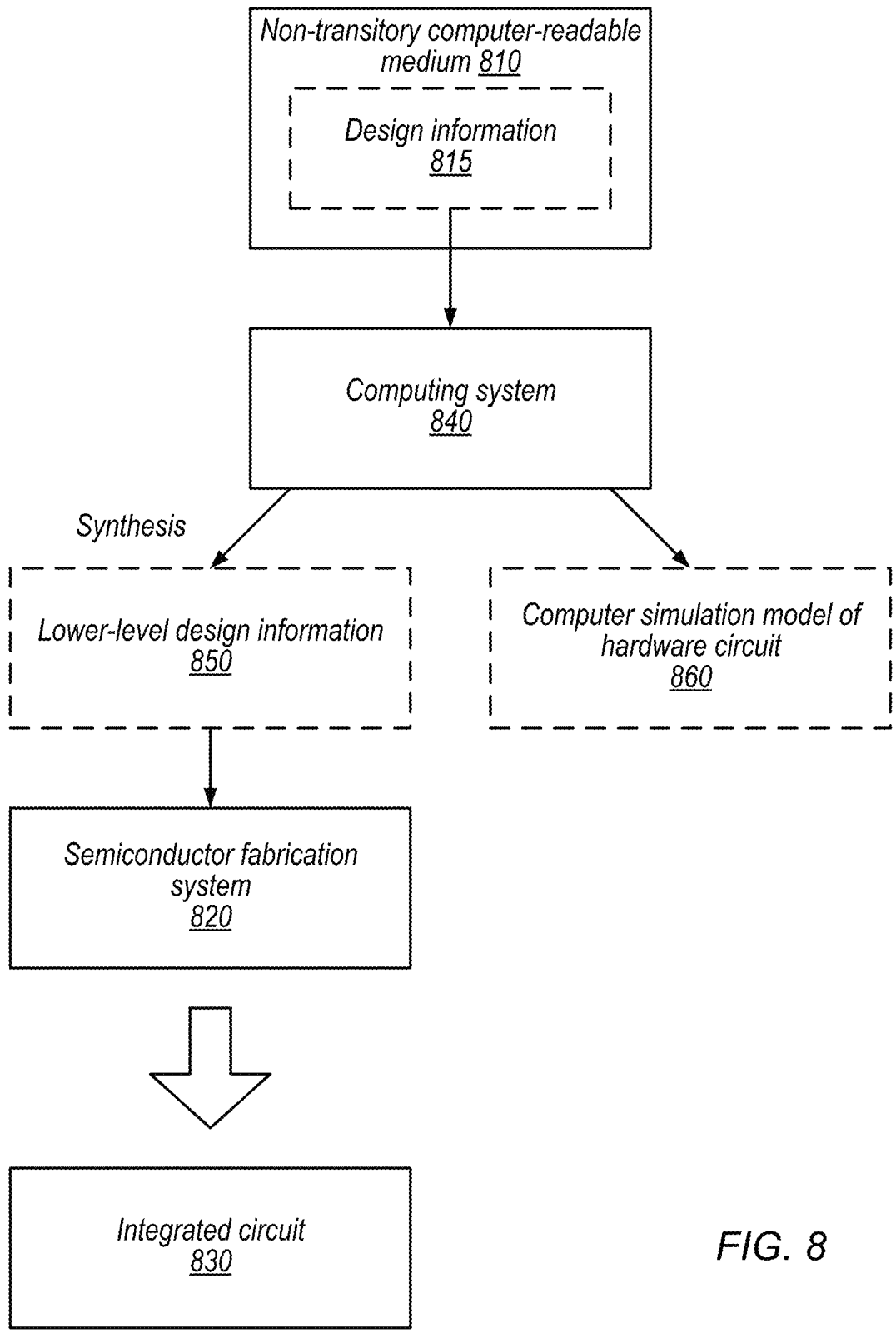
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment, computing system 840 is configured to process the design information. This may include executing instructions included in the design information, interpreting instructions included in the design information, compiling, transforming, or otherwise updating the design information, etc. Therefore, the design information controls computing system 840 (e.g., by programming computing system 840) to perform various operations discussed below, in some embodiments.

In the illustrated example, computing system 840 processes the design information to generate both a computer simulation model of a hardware circuit 860 and lower-level design information 850. In other embodiments, computing system 840 may generate only one of these outputs, may generate other outputs based on the design information, or both. Regarding the computing simulation, computing system 840 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 840 also processes the design information to generate lower-level design information 850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 850 (potentially among other inputs), semiconductor fabrication system 820 is configured to fabricate an integrated circuit 830 (which may correspond to functionality of the simulation model 860). Note that computing system 840 may generate different simulation models based on design information at various levels of description, including information 850, 815, and so on. The data representing design information 850 and model 860 may be stored on medium 810 or on one or more other media.

In some embodiments, the lower-level design information 850 controls (e.g., programs) the semiconductor fabrication system 820 to fabricate the integrated circuit 830. Thus, when processed by the fabrication system, the design information may program the fabrication system to fabricate a circuit that includes various circuitry disclosed herein.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Accordingly, non-transitory computer-readable storage medium 810 may include two or more memory media; such media may reside in different locations—for example, in different computer systems that are connected over a network.

Design information 815 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 840, semiconductor fabrication system 820, or both. In some embodiments, design information may also include one or more cell libraries that specify the synthesis, layout, or both of integrated circuit 830. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 830 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 and model 860 are configured to operate according to a circuit design specified by design information 815, which may include performing any of the functionality described herein. For example, integrated circuit 830 may include any of various elements shown in FIGS. 1, 2, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 820 to fabricate integrated circuit 830.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
primary processor circuitry that includes an execution pipeline; and
secondary processor circuitry that includes:
translation lookaside buffer circuitry that includes multiple entries configured to store translation information, wherein a given entry includes first-level permission information;
permission circuitry configured to store second-level permission information specified by the primary processor circuitry; and
wherein:
the secondary processor circuitry is configured to determine whether a given memory access is permitted based on both the first-level permission information and the second-level permission information;
the primary processor circuitry is configured to send, based on execution of a remote-permission-tableinvalidate instruction by the execution pipeline, a permission invalidate command to the secondary processor circuitry; and the secondary processor circuitry is configured to, in response to the permission invalidate command, invalidate one or more entries in the permission circuitry that store second-level permission information.

2. The apparatus of claim 1, further comprising:
memory circuitry configured to store second-level permission information specified by the primary processor circuitry;
wherein the permission circuitry is configured to store second-level permission information retrieved from the memory circuitry.

3. The apparatus of claim 2, wherein the secondary processor circuitry is configured to perform direct memory address (DMA) operations to the memory circuitry.

4. The apparatus of claim 1, wherein the primary processor circuitry is configured to execute secure software to generate the second-level permission information.

5. The apparatus of claim 1, wherein a given entry of the permission circuitry includes second-level permission information for a region of memory that is greater in size than the size of memory access operations that the secondary processor circuitry is configured to perform.

6. The apparatus of claim 5, wherein:
the permission circuitry is a direct mapped cache; and
the secondary processor circuitry is configured to index into the permission circuitry based on a set of upper bits of a given memory address.

7. The apparatus of claim 1, wherein the secondary processor circuitry is configured to perform the permission invalidation without executing any instructions on the secondary processor circuitry.

8. The apparatus of claim 1, wherein:
the secondary processor circuitry further includes power management circuitry configured to place the secondary processor circuitry in a low-power state; and
the apparatus is configured to guarantee, when operating in a low-power state, the invalidation of the one or more entries in permission circuitry.

9. The apparatus of claim 8, wherein:
the secondary processor circuitry further includes buffer circuitry configured to store, when operating in the low-power state, the permission invalidate command; and
the secondary processor circuitry is configured to retrieve and perform the permission invalidate command in response to exiting the low-power state.

10. The apparatus of claim 1, wherein:
the primary processor circuitry is further configured to send a barrier command in conjunction with the permission invalidate command, wherein the barrier command ensures completion of older memory access operations that access at least one entry specified by the invalidate command to determine respective access permission.

11. The apparatus of claim 1, wherein:
the permission invalidate command is included in a packet transmitted on a communication fabric, wherein the packet includes at least the following:
information that specifies one or more addresses whose corresponding permissions are to be invalidated; and
an identifier of the secondary processor circuitry.

12. The apparatus of claim 1, wherein the apparatus is a computing device that further includes:

a display; and
network interface circuitry.

13. A method, comprising:
storing, by secondary processor circuitry, first-level permission information;
storing, in permission circuitry of the secondary processor circuitry, second-level permission information;
determining, by the secondary processor circuitry, whether a given memory access is permitted based on both the first-level permission information and the second-level permission information;
sending, by primary processor circuitry based on execution of a remote-permission-table-invalidate instruction, a permission invalidate command to the secondary processor circuitry; and
invalidating, by the secondary processor circuitry in response to the permission invalidate command, one or more entries in the permission circuitry that store second-level permission information.

14. The method of claim 13, wherein:
the permission invalidate command is included in a packet transmitted on a communication fabric, wherein the packet includes at least the following:
information that specifies one or more addresses whose corresponding permissions are to be invalidated; and
an identifier of the secondary processor circuitry.

15. The method of claim 13, further comprising:
sending, by the primary processor circuitry, a barrier command in conjunction with the permission invalidate command, wherein the barrier command ensures completion of older memory access operations that access at least one entry specified by the invalidate command to determine respective access permission.

16. The method of claim 13, further comprising:
storing, in buffer circuitry of the secondary processor circuitry, the permission invalidate command when the secondary processor circuitry is in a low-power state; and
retrieving and performing, by the secondary processor circuitry in response to exiting the low-power state, the stored permission invalidate command.

17. A non-transitory computer-readable medium having instructions of a hardware description programming language stored thereon that, when processed by a computing system, program the computing system to generate a computer simulation model, wherein the model represents a hardware circuit that includes:
primary processor circuitry that includes an execution pipeline; and
secondary processor circuitry that includes:
translation lookaside buffer circuitry that includes multiple entries configured to store translation information, wherein a given entry includes first-level permission information;
permission circuitry configured to store second-level permission information specified by the primary processor circuitry; and
wherein:
the secondary processor circuitry is configured to determine whether a given memory access is permitted based on both the first-level permission information and the second-level permission information;
the primary processor circuitry is configured to send, based on execution of a remote-permission-table-invalidate instruction by the execution pipeline, a permission invalidate command to the secondary processor circuitry; and the secondary processor circuitry is configured to, in response to the permission invalidate command, invalidate one or more entries in the permission circuitry.

18. The non-transitory computer-readable medium of claim 17, wherein the hardware circuit further includes:

memory circuitry configured to store second-level permission information specified by the primary processor circuitry;

wherein the permission circuitry is configured to store second-level permission information retrieved from the memory circuitry.

19. The non-transitory computer-readable medium of claim 17, wherein the secondary processor circuitry is configured to perform the permission invalidation without executing any instructions on the secondary processor circuitry.

20. The non-transitory computer-readable medium of claim 17, wherein:

the secondary processor circuitry further includes power management circuitry configured to place the secondary processor circuitry in a low-power state;

the secondary processor circuitry further includes buffer circuitry configured to store, when operating in the low-power state, the permission invalidate command; and the secondary processor circuitry is configured to retrieve and perform the permission invalidate command in response to exiting the low-power state.

* * * * *

UNITED STATES PATENT AND TRADEMARK OFFICE
CERTIFICATE OF CORRECTION

| | |
|---|---|
| PATENT NO. | : 12,468,644 B2 |
| APPLICATION NO. | : 18/742597 |
| DATED | : November 11, 2025 |
| INVENTOR(S) | : Gaurav Garg et al. |

It is certified that error appears in the above-identified patent and that said Letters Patent is hereby corrected as shown below:

In the Specification

In Column 10, Lines 36-37, please delete "the permission circuitry the permission circuitry" and insert -- the permission circuitry --.

Signed and Sealed this
Ninth Day of December, 2025

John A. Squires
*Director of the United States Patent and Trademark Office*